(12) United States Patent
Keller et al.

(10) Patent No.: US 7,891,581 B2
(45) Date of Patent: Feb. 22, 2011

(54) POSITIONING DEVICE FOR A COVER OF A HEADLIGHT CLEANING SYSTEM

(75) Inventors: Markus Keller, Leonberg (DE); Adrian Beer, Böblingen (DE); Heinz-Arno Kruschhausen, Wiernsheim (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 399 days.

(21) Appl. No.: 11/821,670

(22) Filed: Jun. 25, 2007

(65) Prior Publication Data

US 2008/0093478 A1    Apr. 24, 2008

(30) Foreign Application Priority Data

Jun. 24, 2006   (DE)   ................... 10 2006 029 069

(51) Int. Cl.
   *B05B 1/10*    (2006.01)
(52) U.S. Cl. ................. 239/284.2; 239/281; 239/288.3
(58) Field of Classification Search ............. 239/284.1, 239/284.2, 28, 288–288.511
   See application file for complete search history.

(56) References Cited

U.S. PATENT DOCUMENTS 5,769,528 A * 6/1998 Dinant ................... 362/96

FOREIGN PATENT DOCUMENTS

| DE | 43 28 570 A1 | 3/1995 |
|---|---|---|
| DE | 196 26 179 A1 | 1/1998 |
| DE | 199 18 759 A1 | 10/2000 |
| EP | 1 046 560 A1 | 10/2000 |
| EP | 1 512 595 A1 | 3/2005 |
| FR | 2 681 031 | 3/1993 |
| WO | 2006/024782 A1 | 3/2006 |

OTHER PUBLICATIONS

English abstract of European Patent Application EP 1 125 808 A2 (Wysocki), dated Aug. 22, 2001.
English abstract of German Published Non-Prosecuted Patent Application DE 198 24 085 A1 (Kugler et al.), dated Dec. 9, 1999.
English abstract of German Published Non-Prosecuted Patent Application DE 198 11 163 A1 (Erkens), dated Sep. 16, 1999.
English abstract of German Published Non-Prosecuted Patent Application DE 43 28 570 A1 (Gerstner et al.), dated Mar. 2, 1995.

* cited by examiner

*Primary Examiner*—Christopher S Kim

(57) ABSTRACT

A cover of a headlight cleaning system, which cover covers an opening in a vehicle front-end part and at the same time bears the headlight cleaning system, can be positioned precisely via latching mounts on the vehicle front-end part and latching lugs on the opposite cover. The effect achieved by this is that the cover, when retracted from an operative position into an inoperative position in a stamped formation, is arranged in a precise gap.

4 Claims, 3 Drawing Sheets

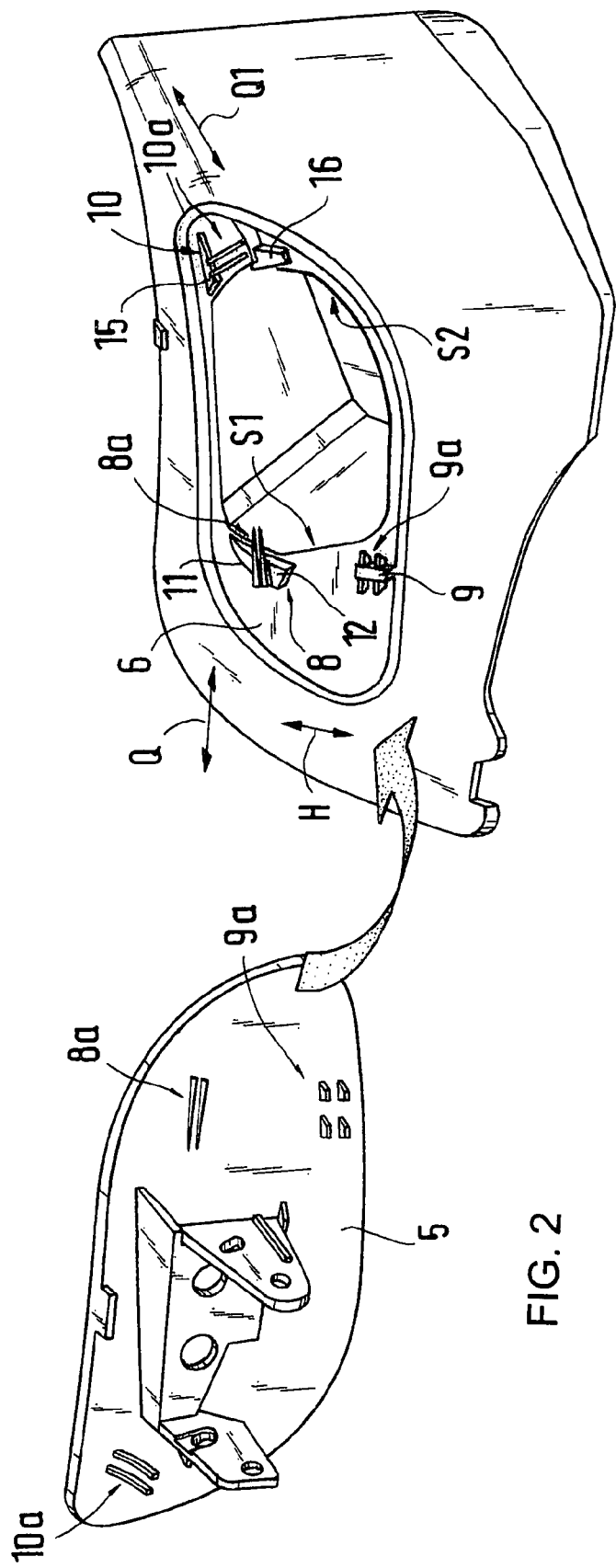

POSITIONING DEVICE FOR A COVER OF A HEADLIGHT CLEANING SYSTEM

CROSS-REFERENCE TO RELATED APPLICATION

This application claims the priority, under 35 U.S.C. §119, of German application DE 10 2006 029 069.0, filed Jun. 24, 2006; the prior application is herewith incorporated by reference in its entirety.

BACKGROUND OF THE INVENTION

Field of the Invention

The invention relates to a positioning device for a cover of a headlight cleaning system having nozzles which are held behind a vehicle front-end part and are disposed in a manner such that they can be retracted and extended from an inoperative position into an operative position through an opening. The opening is closed by the cover in the retracted state, an inoperative position, of the headlight cleaning system and the cover being raised from the opening in the extended state, being an operative position.

Published, non-prosecuted German patent application DE 199 18 759 A1 discloses a centering device on a cover for closing an opening for a headlight cleaning system or for a nozzle of this system in an outer wall part of a motor vehicle, which centering device is disposed on the inside of the cover and fixes the cover toward the opening in the inoperative position.

SUMMARY OF THE INVENTION

It is accordingly an object of the invention to provide a positioning device for a cover of a headlight cleaning system which overcomes the above-mentioned disadvantages of the prior art devices of this general type, which, when headlight cleaning nozzles are retracted from an operative position into an inoperative position, ensures a precise position in a stamped formation of a vehicle front-end part.

With the foregoing and other objects in view there is provided, in accordance with the invention, a positioning device for a cover of a headlight cleaning system having nozzles held behind a vehicle front-end part having an opening formed therein. The nozzles are disposed to be retracted and extended from an inoperative position, being a retracted state, into an operative position, being an extended state, through the opening. The opening being closed by the cover in the retracted state of the headlight cleaning system and the cover being raised from the opening in the extended state. The positioning device includes protruding latching lugs disposed on the cover; and a plurality of latching mounts disposed on a circumference around the opening and disposed in a corresponding manner to correspondingly configured ones of the protruding latching lugs. And, in the retracted state of the cover, the protruding latching lugs engage in the latching mounts or vice versa.

The advantages primarily obtained by the invention are that a precise positioning of the cover holding the headlight cleaning nozzle in a stamped impression or formation of a vehicle front-end part takes place by a plurality of complementary latching mounts and latching lugs. In particular, it is provided according to the invention that a plurality of latching mounts are provided on the circumference of the opening, which latching mounts are disposed in a corresponding manner to correspondingly configured, protruding latching lugs on the cover and, in the retracted, closed state (inoperative position) of the cover, the latching lugs engage in the latching mounts, or vice versa. The cover is disposed in the "stamped formation or impression" of the vehicle front-end part and, in the closed state (inoperative position), is disposed level with the outer surface of the front-end part in a precisely positioned manner via the latching mounts and latching lugs. The embedded configuration of the cover in the vehicle front-end part requires the gap around the cover to be of identical width, which is ensured by the latching mounts and latching lugs acting in a positioning manner.

The effect achieved by the invention, on account of the different orientations of the latching mounts and the corresponding latching lugs disposed with respect thereto is that the cover, when assuming the inoperative position, can be correspondingly aligned. For this purpose, it is provided according to the invention that the latching mounts are disposed on lateral boundary edges of the opening in the stamped formation, with two latching mounts being disposed on an inner boundary edge and the further latching mount being disposed on the opposite, outer boundary edge.

In particular, groove-shaped latching mounts are provided opposite each other on the lateral boundary edges of the opening and the protruding latching lugs are located opposite them in the cover. The support of the latching lugs in the latching recesses takes place first on the longitudinal sides and second on the end sides of the latching lugs.

The protruding latching lugs in the cover contain, for example, two ribs which lie parallel next to each other and are held in the groove-shaped latching mounts of the front-end part. The groove-shaped latching mounts contain protruding cams which form a transverse groove in each case between them.

The further latching mount on the lateral boundary edge of the opening of the front-end part contains a protruding cam which is engaged around by protruding ribs of the latching lug on the cover.

By this configuration of the latching mounts with latching lugs of the cover centering in different directions, it is ensured that the cover is disposed in a manner such that it can be precisely positioned in the stamped formation of the front-end part when retracted from the operative position into the inoperative position.

Other features which are considered as characteristic for the invention are set forth in the appended claims.

Although the invention is illustrated and described herein as embodied in a positioning device for a cover of a headlight cleaning system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 2 is a diagrammatic, perspective inner view of the cover with latching lugs;

FIG. 3 is a diagrammatic, perspective top view of the vehicle front-end part with latching mounts with the latching lugs of the cover pushed into them;

DESCRIPTION OF THE PREFERRED EMBODIMENTS OF THE INVENTION

Figure 1:
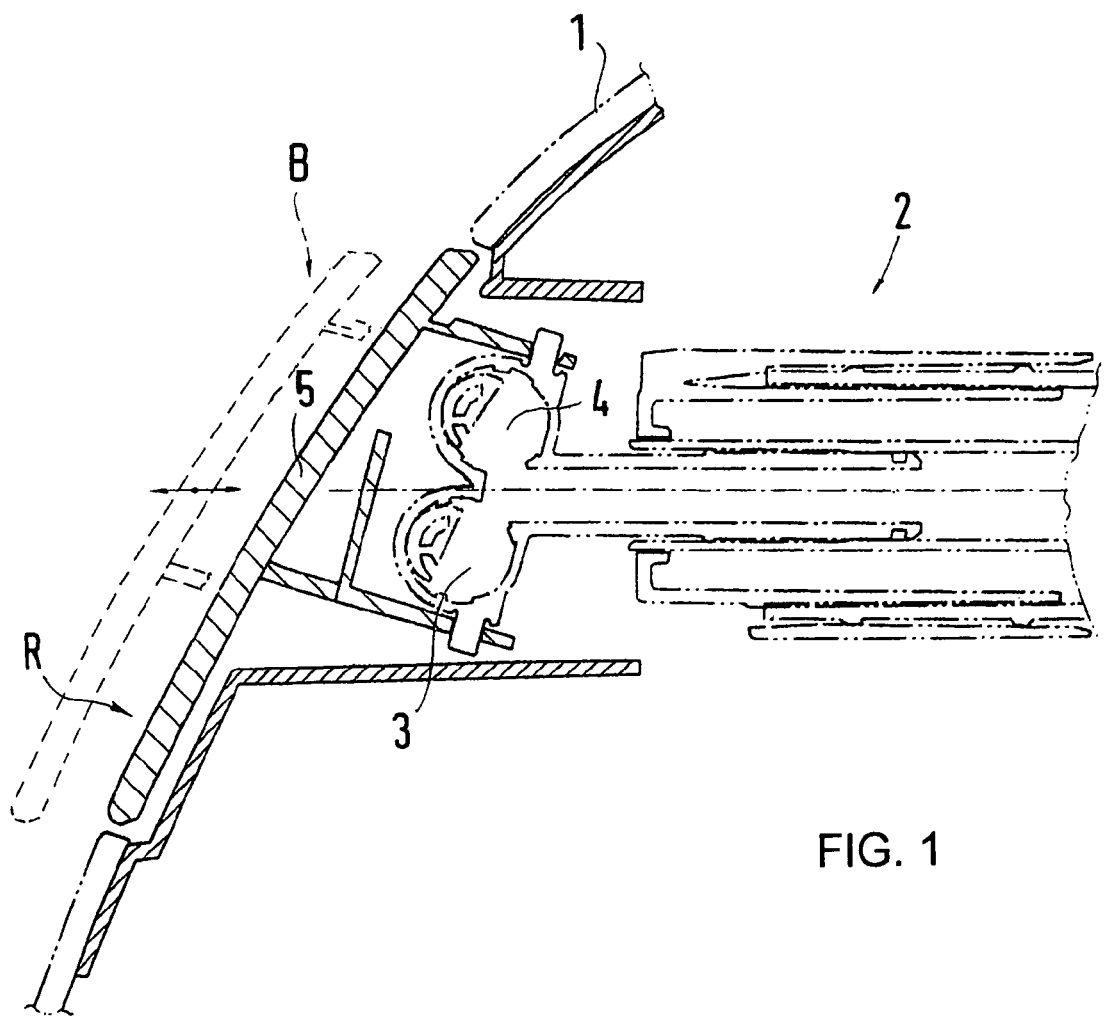
FIG. 1 is a diagrammatic, vertical sectional view through a vehicle front-end part with a headlight cleaning nozzle inserted and with a cover in an inoperative position according to the invention.

Referring now to the figures of the drawing in detail and first, particularly, to FIG. 1 thereof, there is shown a respective headlight cleaning system 2 with one or two water nozzles 3, 4, which can be extended into an operative position B and retracted in an inoperative position R. The headlight cleaning system 2 is disposed in a vehicle front-end part 1 on both sides of a vehicle.

Figure 4:
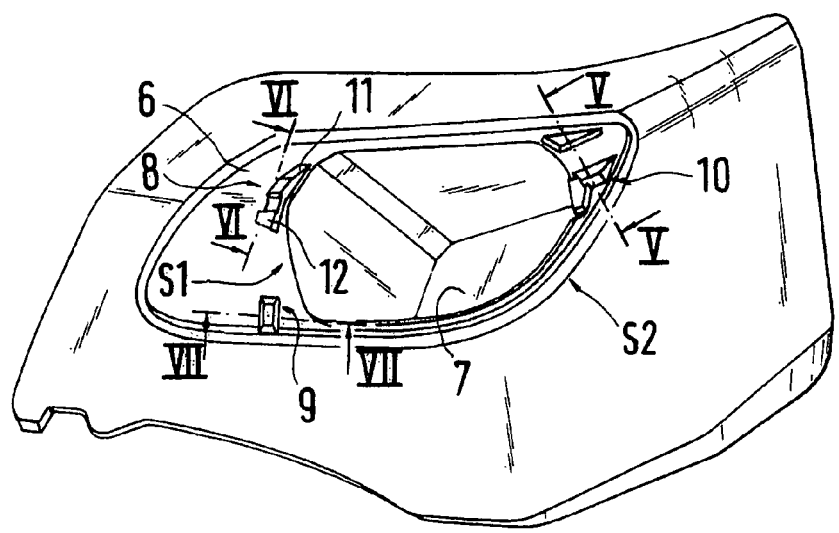
FIG. 4 is a diagrammatic, perspective view of the latching mounts having latching recesses according to FIG. 3.

The nozzles 3, 4 are connected to a cover 5 which is disposed in a stamped formation 6 of the vehicle front-end part 1, which has an opening 7 for the passage and configuration of the nozzles 3, 4 for the headlight cleaning system 2 so that headlight lenses can be acted upon by water, also see FIGS. 3 and 4.

In order to position the retracted cover 5 in the stamped formation 6, latching mounts 8, 9 and 10 are disposed around the opening 7. In a corresponding manner to the latching mounts 8, 9, 10, latching lugs 8a, 9a and 10a are provided on an inside of the cover 5 and are held in latching recesses of the latching mounts 8, 9, 10 in the inoperative position R of the cover 5 (see FIG. 2).

The latching mounts 8, 9, 10 are disposed on side edges S1 and S2 of the opening 7. As illustrated in more detail in FIG. 3, the latching mounts 8 and 9 are disposed on the inner side edge S1 and a latching mount 10 is disposed on the outer side edge S2.

Figure 6:
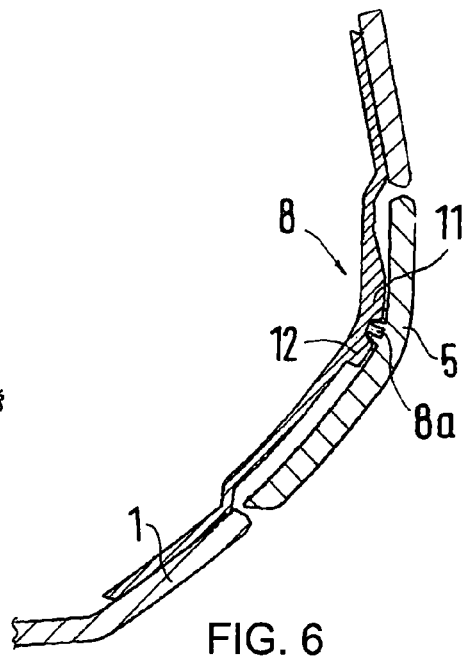
FIG. 6 is a diagrammatic, sectional view, taken along the line VI-VI shown in FIG. 4, through a second latching recess on an opposite side edge of the opening with the cover inserted and with the latching lug.

The latching mount 8 contains two cam-shaped elevations 11, 12 between which a transverse groove (with respect to the vehicle) is formed in order to receive the latching lug 8a of the cover 5 (FIGS. 3, 4). The latching lug 8a contains two ribs which run transversely and are supported by the side flanks on the cam-shaped elevations 11, 12 as further shown in FIG. 6.

Figure 5:
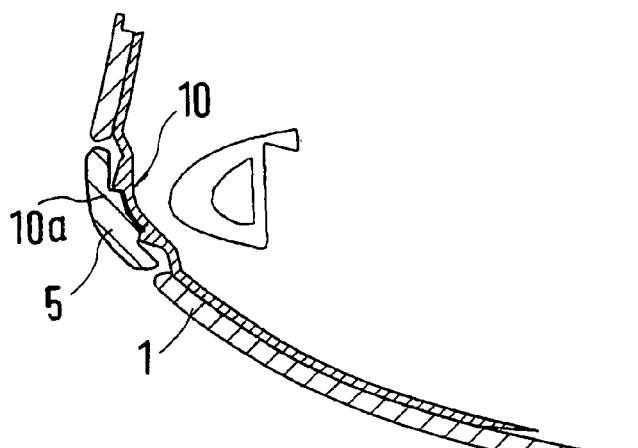
FIG. 5 is a diagrammatic, sectional view, taken along the line V-V shown in FIG. 4, through a first latching recess on a side edge of an opening on the stamped formation of the front-end part with the cover inserted and with the latching lugs.
Figure 7:
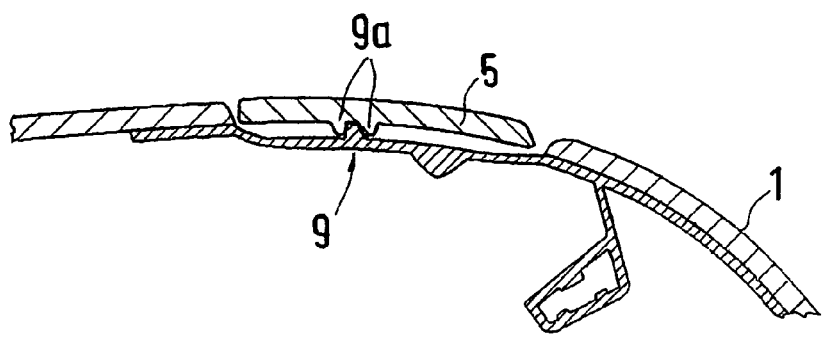
FIG. 7 is a diagrammatic, sectional view, taken along the line VII-VII shown in FIG. 4, through a third latching recess with the cover inserted and with the latching lug.

The further latching mount 9 contains a protruding cam, rib or the like which runs longitudinally or runs in the vertical direction and is grasped on both sides by the latching lug 9a (see FIG. 7). The latching lug 9a contains two ribs which run transversely, are divided in the center and receive the cam between them and are supported on the cam by their end edges. The latching mount 10 on the side edge S2 contains two protruding cams 15, 16 between which a transverse groove is formed in which is disposed the latching lug 10a which contains two ribs which are supported at their ends on the cam (see FIG. 5).

Upon retraction into the inoperative position R into the latching mounts 8, 9, 10 and the latching lugs 8a, 9a, 10a, the cover 5 can therefore be adjusted within limits in a vertical direction H and in a transverse direction Q and in an oblique transverse direction Q1 and can therefore be positioned precisely.

We claim:

1. A combination of a headlight cleaning system and a positioning device for a cover of the headlight cleaning system, the headlight cleaning system comprising nozzles held behind a vehicle front-end part having a surface with an opening formed therein, the surface having an inner lateral boundary edge and an opposite outer lateral boundary edge defining the opening, the nozzles disposed to be retracted and extended through the opening, the nozzles moving from a retracted state defining an inoperative position into an extended state defining an operative position, the opening being closed by the cover in the retracted state and the cover being raised from the opening in the extended state, the positioning device comprising:

protruding latching lugs disposed on the cover; and a plurality of latching mounts disposed on said inner lateral boundary edge and on said opposite outer lateral boundary edge, said plurality of latching mounts disposed in a manner corresponding to correspondingly configured ones of said protruding latching lugs;

in the retracted state of the cover, said protruding latching lugs engaging in said latching mounts or vice versa;

two of said plurality of latching mounts disposed on the inner boundary edge and a third one of said latching mounts disposed on the opposite outer boundary edge of the opening;

at least one of said plurality of latching mounts being a groove-shaped latching mount and at least one of said protruding latching lugs being disposed on the cover and being disposed opposite said groove-shaped latching mount;

a further one of said protruding latching lugs being a latching lug with protruding ribs; and one of said latching mounts disposed on said inner boundary edge of the opening of the vehicle front-end part including a protruding cam having opposite sides engaged by said protruding ribs of said further one of said protruding latching lugs disposed on the cover.

2. The combination according to claim 1, wherein the vehicle front-end part has a stamped impression/formation and the opening is formed in the stamped impression/formation, and in the retracted state, the cover is disposed level with an outer surface of the vehicle front-end part in a precisely positioned manner via said latching mounts and said protruding latching lugs.

3. The combination according to claim 1, wherein one of said protruding latching lugs on the cover includes two ribs which lie parallel and next to each other; and said two ribs are held in said groove-shaped latching mount disposed on the vehicle front-end part.

4. The combination according to claim 1, wherein at least one of said groove-shaped latching mounts includes protruding cams, and a transverse groove is formed between the protruding cams.

* * * * *